(12) United States Patent
Xiang

(10) Patent No.: US 12,437,241 B2
(45) Date of Patent: *Oct. 7, 2025

(54) MACHINE LEARNING MODEL REGISTRY

(71) Applicant: Opendoor Labs Inc., San Francisco, CA (US)

(72) Inventor: Chongyuan Xiang, San Francisco, CA (US)

(73) Assignee: Opendoor Labs Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,506

(22) Filed: Jan. 25, 2024

(65) Prior Publication Data

US 2024/0161018 A1 May 16, 2024

Related U.S. Application Data

(63) Continuation of application No. 17/962,165, filed on Oct. 7, 2022, now Pat. No. 11,972,337, which is a continuation of application No. 16/835,710, filed on Mar. 31, 2020, now Pat. No. 11,494,703.

(60) Provisional application No. 62/981,679, filed on Feb. 26, 2020.

(51) Int. Cl.
*G06N 20/20* (2019.01)
*G06F 17/18* (2006.01)
*G06N 5/04* (2023.01)

(52) U.S. Cl.
CPC .......... *G06N 20/20* (2019.01); *G06F 17/18* (2013.01); *G06N 5/04* (2013.01)

(58) Field of Classification Search
CPC .......... G06N 20/20; G06N 5/04; G06F 17/15

USPC .......................................................... 706/12
See application file for complete search history.

(56) References Cited

U.S. PATENT DOCUMENTS

| 8,843,427 | B1 | 9/2014 | Lin et al. |
| 10,685,308 | B1 | 6/2020 | Avery, Jr. et al. |
| 10,965,484 | B2* | 3/2021 | Rajashekar Vashisht ................... H04L 67/566 |
| 11,094,024 | B2* | 8/2021 | Burns .................. G06Q 50/167 |

(Continued)

OTHER PUBLICATIONS

U.S. Appl. No. 16/835,710 U.S. Pat. No. 11,494,703, filed Mar. 31, 2020, Machine Learning Model Registry.

(Continued)

*Primary Examiner* — William D Titcomb
(74) *Attorney, Agent, or Firm* — Schwegman Lundberg & Woessner, P.A.

(57) ABSTRACT

Systems and methods to utilize a machine learning model registry are described. The system deploys a first version of a machine learning model and a first version of an access module to server machines. Each of the server machines utilizes the model and the access module to provide a prediction service. The system retrains the machine learning model to generate a second version. The system performs an acceptance test of the second version of the machine learning model to identify it as deployable. The system promotes the second version of the machine learning model by identifying the first version of the access module as being interoperable with the second version of the machine learning model and by automatically deploying the first version of the access module and the second version of the machine learning model to the plurality of server machines to provide the prediction service.

20 Claims, 11 Drawing Sheets

(56) References Cited

U.S. PATENT DOCUMENTS

| | | | |
|---|---|---|---|
| 11,164,199 B2* | 11/2021 | Lundgren | G06Q 30/0206 |
| 11,182,691 B1 | 11/2021 | Zhang | |
| 11,243,933 B2* | 2/2022 | Chen | G06N 20/00 |
| 11,257,002 B2 | 2/2022 | Faulhaber, Jr. et al. | |
| 11,341,339 B1 | 5/2022 | Li et al. | |
| 11,494,703 B2* | 11/2022 | Xiang | G06N 20/20 |
| 11,593,704 B1 | 2/2023 | Jenatton et al. | |
| 11,605,021 B1 | 3/2023 | Khare et al. | |
| 11,704,566 B2* | 7/2023 | Ma | G06F 11/3495 |
| | | | 706/12 |
| 11,797,535 B1 | 10/2023 | Stefani et al. | |
| 11,809,966 B2* | 11/2023 | Chen | G06F 18/2148 |
| 11,972,337 B2* | 4/2024 | Xiang | G06N 20/20 |
| 2018/0157993 A1* | 6/2018 | Northrup | G06N 20/00 |
| 2018/0293498 A1 | 10/2018 | Campos et al. | |
| 2019/0294999 A1 | 9/2019 | Guttmann | |
| 2019/0370695 A1 | 12/2019 | Chandwani et al. | |
| 2020/0012935 A1* | 1/2020 | Goodsitt | G06V 30/1985 |
| 2020/0060007 A1 | 2/2020 | Harrison et al. | |
| 2020/0104959 A1 | 4/2020 | Ensign | |
| 2020/0210867 A1* | 7/2020 | Banis | G06N 20/00 |
| 2020/0234121 A1 | 7/2020 | Stapleton et al. | |
| 2020/0285899 A1 | 9/2020 | Chen et al. | |
| 2020/0327457 A1 | 10/2020 | Cmielowski et al. | |
| 2020/0401948 A1 | 12/2020 | Ma et al. | |
| 2021/0065064 A1 | 3/2021 | Xu et al. | |
| 2021/0097444 A1 | 4/2021 | Bansal et al. | |
| 2021/0208545 A1 | 7/2021 | Zhang et al. | |
| 2021/0232980 A1 | 7/2021 | Velagapudi et al. | |
| 2021/0264321 A1 | 8/2021 | Xiang | |
| 2021/0326717 A1 | 10/2021 | Mueller et al. | |
| 2022/0100831 A1 | 3/2022 | Moreno et al. | |
| 2023/0036004 A1 | 2/2023 | Xiang | |
| 2024/0086867 A1* | 3/2024 | Miller | G06Q 10/06315 |

OTHER PUBLICATIONS

U.S. Appl. No. 17/962,165, filed Oct. 7, 2022, Machine Learning Model Registry.

"U.S. Appl. No. 16/835,710, Notice of Allowance mailed Jul. 7, 2022", 9 pgs.

"U.S. Appl. No. 17/962,165, Non Final Office Action mailed Aug. 24, 2023", 19 pgs.

"U.S. Appl. No. 17/962,165, Notice of Allowance mailed Dec. 26, 2023", 6 pgs.

"U.S. Appl. No. 17/962,165, Response filed Nov. 22, 2023 to Non Final Office Action mailed Aug. 24, 2023", 11 pgs.

* cited by examiner

MACHINE LEARNING MODEL REGISTRY

RELATED APPLICATION

This application is a continuation of U.S. patent application Ser. No. 17/962,165, filed Oct. 7, 2022, which is a continuation of U.S. patent application Ser. No. 16/835,710, filed Mar. 31, 2020, which claims the benefit of U.S. Provisional Patent Application No. 62/981,679, filed Feb. 26, 2020, which are incorporated by reference in their entirety.

TECHNICAL FIELD

This disclosure relates to the technical field of data communications and more particularly to a machine learning model registry.

DETAILED DESCRIPTION

Figure 1:
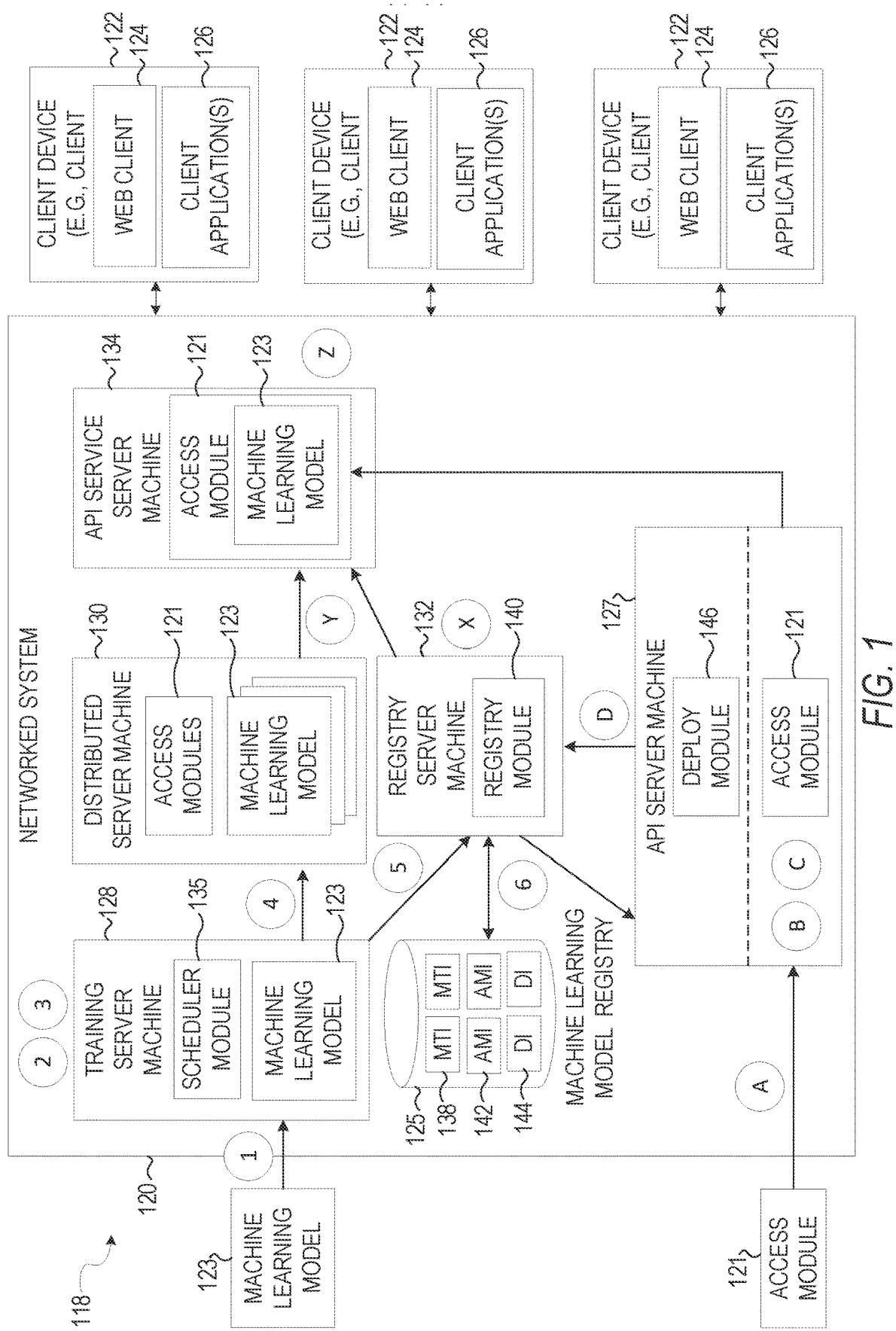
FIG. 1 is a block diagram illustrating a machine learning model registry system, according to example embodiments.

According to an aspect of the present disclosure, a machine learning model registry system is disclosed. The machine learning model registry system may be utilized to deploy a first version of a machine learning model and a first version of an access module to server machines. The first version of the machine learning model and the first version of the access module interoperate on each of the server machines to provide a prediction service. The prediction service is provided to users who operate client machines. In one example embodiment, server machines provide the prediction service to predict a home price. For example, the prediction service may predict a home price responsive to receiving an estimate of square footage of a home and an address identifying a location of the home.

The machine learning model registry system may periodically generate a new version of the machine learning model based on training data that has been updated and/or based on actual data that has been updated. Further, the machine learning model registry system may receive a new version of the machine learning model from a client machine (e.g., comprising modifications). In one example embodiment, the machine learning model registry system performs an acceptance test of the new (e.g., second) version of the machine learning model before deployment. For example, the machine learning model registry system performs validation of the second version of the machine learning model based on one or more criteria. The machine learning model registry system performs the validation to identify whether the second version of the machine learning model is deployable.

In one example embodiment, the machine learning model registry system provides a user interface to allow a user to compare the performance of the first version of the machine learning model with the second version of the machine learning model. The comparison may facilitate a user decision about whether to update the prediction service with the second version of the machine learning model. The user may utilize the user interface to deploy the second version of the machine learning model. If the user decides to deploy the second version of the machine learning model, then the user may utilize the user interface to promote the second version of the machine learning model. For example, the user may request the machine learning model registry system to promote the second version of the machine learning model. The machine learning model registry system responds to the request by: 1) automatically identifying the first version of the access module interoperating with the second version of the machine learning model, and 2) automatically deploying the first version of the access module and the second version of the machine learning model to the server machines to provide the prediction service based on the second version of the machine learning model and the first version of the access module.

The machine learning model registry system may further receive a second version of the access module while a first version of a machine learning model is deployed. For example, a user committing a second version of the access module to a source control system causes the machine learning model registry system to perform an acceptance test of the second version of the access module and to deploy the second version of the access module responsive to identifying the acceptance test as passing. For example, the machine learning model registry system performs the acceptance test based on one or more criteria. In one example embodiment, the machine learning model registry system includes an acceptance test that: 1) automatically identifies whether the second version of the access module interoperates with the first version of the machine learning model, and 2) automatically deploys the second version of the access module and the first version of the machine learning model to the server machines to provide the prediction service based on the first version of the machine learning model and the second version of the access module.

FIG. 1 is a block diagram illustrating a machine learning model registry system 118, according to example embodiments. The machine learning model registry system 118 includes a networked system 120, according to example embodiments. According to one embodiment, the machine learning model registry system 118 is configured to receive, train, acceptance test, and deploy access modules 121 and to receive, train, validate, and deploy machine learning models 123. For example, a version of an access module 121 and a version of a machine learning model 123 may be identified as interoperating to be deployed to provide a prediction service that make predictions, as previously described. The predictions may include a simulation of projections for negotiation loss, price drop slope, markup, and other aspects of home buying and selling. An application processing interface service provides access to the version of the access module 121 that, in turn, provides access to the version of the machine learning model 123 that, in turn, generates one or more predictions responsive to a request. The projected simulations may be used to identify a value to offer to a homeowner to buy their home, a fee to charge a homeowner to buy their home, a price drop slope, a fair market valuation of the home, a list price for the home, and so forth. For example, the networked system 120 may be embodied as the online home selling system offered by Opendoor Labs Inc. of San Francisco, California.

The networked system 120 is communicatively coupled to one or more client devices such as client device 122. Each of the client devices 122 may be utilized to generate and submit a new version of the machine learning model 123 to a machine learning model registry 125 (e.g., model registry), generate and submit a new version the access module 121 to the machine learning model registry 125, or utilize the application processing interface service to request predictions. The client device 122 includes a web client 124 and one or more client applications 126. The client device 122 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box (STB), computer in a vehicle, or any other communication device that a user may utilize to access the networked system 120. In some embodiments, the client device 122 may comprise a display module (not shown) to display information (e.g., in the form of user interfaces). In further embodiments, the client device 122 may comprise one or more of touch screens, accelerometers, gyroscopes, cameras, microphones, global positioning system (GPS) devices, and so forth.

The various server machines and client devices are interconnected over a network. One or more portions of the network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 122 may access the various data and applications provided by other entities in the networked system 120 via web client 124 (e.g., a browser, such as the Internet Explorer® browser developed by Microsoft® Corporation of Redmond, Washington State) or one or more client applications 126. The client device 122 may include one or more client applications 126 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 126 may be included in a given one of the client device 122, and configured to locally provide the user interface and at least some of the functionalities, with the client applications 126 configured to communicate with other entities in the networked system 120, on an as needed basis, for data and/or processing capabilities not locally available (e.g., access location information, access market information related to homes, to authenticate a user, to verify a method of payment, etc.). Conversely, one or more client applications 126 may not be included in the client device 122, and then the client device 122 may use its web browser to access the one or more applications hosted on other entities in the networked system 120.

The networked system 120 includes a training server machine 128, a distributed server machine 130, a registry server machine 132, an API service server machine 134, and an API server machine 127. At operation "1," the training server machine 128 receives a machine learning model 123 from a client device 122. The training server machine 128 trains the machine learning model 123. For example, the training server machine 128 may include a scheduler module 135 (e.g., cron job) that periodically executes to train the machine learning models 123. The scheduler module 135 trains the machine learning models 123 based on training data information (e.g., sample data) to make predictions or decisions without the machine learning models 123 being explicitly programmed to perform the task. Machine learning is related to computational statistics, which focuses on making predictions using computers as is known in the art of machine learning.

At operation "2," the scheduler module 135 executes to train the machine learning models 123 to generate machine learning model 123 artifacts. The cron job may train the machine learning models 123 based on training data or actual data. For example, the cron job identifies and trains machine learning models 123 that were recently received by the machine learning model registry 125 or previously stored in the machine learning model registry 125. The cron job executes to train machine learning models 123 based on training data or actual data that has been updated. For example, the cron job executes to train existing or machine learning models 123 that are new based on training data or actual data that was recently received (e.g., updated or new training data, updated or new actual data, etc.).

At operation "3," the training service machine 128 validates the machine learning model 123. For example, the cron job validates the machine learning model 123 that has been trained based on one or more criteria. In one embodiment, the cron job validates a machine learning model 123 by comparing the machine learning model 123 that is being validated with a previously trained machine learning model 123 based on predetermined criteria. For example, the validation compares coefficients of the machine learning model 123 that is being validated with the coefficients of the previously trained machine learning model 123 being utilized as a benchmark to determine whether the coefficients of the machine learning model 123 that is being validated is within a predetermined range of the coefficients of the machine learning model 123 being utilized as a benchmark.

In addition, the validation may include replaying past prediction requests and monitoring predictions of the machine learning model 123 being validated. For example, the cron job identifies an access module 121 to validate whether the access module 121 properly interoperates with the machine learning model 123 being validated. In one embodiment, the cron job identifies the access module 121 by searching the machine learning model registry 125 to identify an access module 121 that is registered as deployable, registered as associated with the machine learning model 123, and registered as having the same number of features. If the access module 121 is found, the cron job replays past prediction requests to the identified access module 121 that in turn, communicates the requests to the machine learning model 123 being validated that, in turn, generates the predictions. The cron job may compare the distributions of the predictions that are generated by the machine learning model 123 being validated with the distributions of the predictions of the machine learning model 123 being utilized as a benchmark. For example, the cron job may submit the same requests to the respective machine learning models 123 and compare the distributions. If the cron job identifies the predictions as having similar distribution, then the cron job identifies the machine learning model 123 being validated as having passed validation and registers it as deployable. For example, the cron job identifies distributions as being similar based on a means squared error test. The scheduler module 135 (e.g., cron job) communicates the results of the validation including the interoperability test and the prediction test to the registry server machine 132 that, in turn, stores the results (e.g., metadata) in the appropriate elements of machine training information 138 and deployment information 144 in the machine learning model registry 125.

At operation "4," scheduler module 135 (e.g., cron job), at the training server machine 128, serializes the trained machine learning model 123 and communicates it to the distributed server machine 130. At operation "5," the scheduler module 135 communicates metadata, including the training data (e.g., training data information) for training the version of the machine learning model 123, to the registry server machine 132. At operation "6," registry module 140, at the registry server machine 132, registers (e.g., stores) the training data information and other metadata (e.g., model identifier, model name information, and the like) as model training information 138 in the machine learning model registry 125. Accordingly, the registry module 140 may be utilized to chronicle different versions (e.g., artifacts) of the machine learning model 123 in the distributed server machine 130 and the machine learning model registry 125. According to one embodiment, a user may interact with user interface service provided by the registry server machine 132 through a Google Remote Procedure Call Application Processing Interface (gRPC API) to promote a version of a machine learning model 123, via the machine learning model registry 125, in the distributed server machine 130.

The distributed server machine 130 provides a distributed and scalable means for storing and retrieving the machine learning models 123 and the access modules 121. The distributed server machine 130 may receive machine learning models 123 from the training server machine 128 and communicate machine learning models 123 to the API service server machines 134. In addition, the distributed server machine 130 may receive access modules 121 from the API server machine 127 and deploy access modules 121 to the API service server machines 134 as directed by the API server machine 127 and the registry server machine 132.

The registry server machine 132 includes a registry module 140 and is communicatively coupled to the machine learning model registry 125. The machine learning model registry 125 may include one or more databases. For example, the one or more databases may be stored in and retrieved from high speed, volatile, and non-volatile storage. In one example, the one or more databases may be stored in a cloud-based storage. The machine learning model registry 125 stores the model training information 138, as previously described, access model information 142, and the deployment information 144. The access model information 142 describes a version of an access module 121, as described further in this disclosure. Each element of the deployment information 144 describes a version of an access module 121 and one or more versions of machine learning models 123 that interoperate with the access module 121, as described further in this disclosure. The registry module 140 receives the model training information 138 from the training server machine 128. For example, the registry module 140 receives the model training information 138 from the training server machine 128 and stores the model training information 138 in the machine learning model registry 125. The registry module 140 receives the access model information 142 from the API server machine 127. For example, the registry module 140 receives the access model information 142 from the API server machine 127 and stores the access model information 142 in the machine learning model registry 125.

The API server machine 127 includes a deploy module 146. At operation "A," the deploy module 146 receives an access module 121 from a client device 122. For example, the client device 122 may commit the access module 121 to a source control system that, in turn, records the changes made to the corresponding source code, the author, the date of commit, and the like. According to one embodiment, the deploy module 146 utilizes "git," a distributed version control system utilized to record changes to the deploy module 146 source code. For example, responsive to utilizing "git" to commit an access module 121, "git" returns a "sha" that is utilized as a unique identifier (e.g., the "SHA" or "hash") for the access module 121. According to an embodiment, the unique identifier is stored in the access module information 142 in the machine learning model registry 125 to uniquely identify the version of the access module 121.

At operation "B" and responsive to committing the access module 121, the deploy module 146 executes an acceptance test of the access module 121. The acceptance test may include a replay request test and an interoperability test. For example, the deploy module 146 may replay previous requests to the access module 121 and monitor its prediction. If the access module 121 fails to generate a prediction or generates a prediction that is not within a predetermined range (e.g., acceptable home prices), then the access module 121 fails the acceptance test. The results of the acceptance test may be stored in an element of the access module information 142 (corresponding to the access module 121) in the machine learning model registry 125. For example, the deploy module 146 may register the access module 121 as deployable in the access module information 142.

At operation "C," the deploy module 146 performs an interoperability test and registers the results in the corresponding element of the deployment information 144 in the machine learning model registry 125. The deploy module 146 may perform the interoperability test by identifying the machine learning models 123 that successfully interoperate with the access module 121. For example, the deploy module 146 may identify the machine learning model 123 candidates that successfully interoperate based on identifying common features, expected predictions, and expected predicted units. If, for example, the deploy module 146 identifies the access module 121 and the machine learning model 123 candidate as utilizing a different number of features, then the deploy module 146 identifies the machine learning model 123 candidate as not interoperable. If, for example, the deploy module 146 identifies the access module 121 and the machine learning model 123 candidate operate together to return a prediction not included in a predetermined range, then the deploy module 146 identifies the machine learning model 123 candidate as not interoperable. If, for example, the deploy module 146 identifies the access module 121 and the machine learning model 123 candidate operate together to return a prediction in an unacceptable unit (e.g., dollars rather than cents), then the deploy module 146 identifies the machine learning model 123 candidate as not interoperable. If, for example, the deploy module 146 identifies the access module 121 as successfully interoperating with at least one machine learning model 123, then the deploy module 146 identifies the access module 121 as passing the interoperability test.

At operation "D," the deploy module 146 communicates the results of the acceptance test to the registry server machine 132 that, in turn, stores the results (e.g., metadata) in the appropriate element of access module information 142 and the deployment information 144 in the machine learning model registry 125. If the deploy module 146 identifies the access module 121 as passing the replay request test, then the deploy module causes the access module 121 to be registered as deployable in the appropriate element of access module information 142 in the machine learning model registry 125. In addition, if the deploy module identifies the access module 121 as passing the interoperability test, then the deploy module causes the access module 121 to be registered as deployable in the deployment information 144 in the machine learning model registry 125 and as interoperating with the identified machine learning models 123 in the deployment information 144 in the machine learning model registry 125.

The registry server machine 132 further provides a user interface for the client devices 122. The user interface may be utilized to compare the performances of different versions of a machine learning model 123 and different machine learning models 123. In addition, if the user wants to update the prediction service with a new version of the machine learning model 123, then the user may execute a "promote" command. The promote command receives a machine learning model identifier that identifies the machine learning model 123 and a version of the machine learning model 123 that, in turn, is communicated to the machine learning model registry system 118 that, in turn, automatically identifies a version of an access module 121 that interoperates with the identified version of the machine learning model 123 and deploys the identified version of the access module 121 and the identified version of the machine learning model 123 to one or more API service server machines 134, as described further below.

At operation "X," the registry module 140, at the registry server machine 132, responds to an execution of the "promote" command by automatically identifying a version of the access module 121 that interoperates with the version of the machine learning model 123 that is being promoted. For example, the registry module 140 may receive a model name (e.g., model name information) and model version (e.g., model version identifier) via the user interface and automatically search the deployment information 144 in the machine learning model registry 125 to identify the appropriate access module 121. According to an embodiment, the registry module 140 identifies the appropriate access module 121 by matching the received model version identifier in the deployment information 144 that, in turn, associates the matched model version identifier to the access module 121 (e.g., access module version identifier).

At operation "Y," the registry module 140, at the registry server machine 132, responds to an execution of the "promote" command by automatically deploying the machine learning model 123 identified with the promote command and the access module 121 identified via the deployment information 144 in the machine learning model registry 125 to the API server machines 134. For example, the registry module 140, at the registry server machine 132, deploys the appropriate machine learning model 123 and the appropriate access module 121 to the one or more API service server machines 134 to provide the prediction service.

At operation "Z," the one or more API service server machines 134 provide the prediction service based on the promoted version of the machine learning model 123 and the identified version of the access module 121 that were deployed together. According to one embodiment, the scheduler module 135, the registry module 140, and the deploy module 146 execute on the same server machine (e.g., registry server machine 132). According to one embodiment, the scheduler module 135, the registry module 140, the deploy module 146, the access module 121 and the machine learning model 123 execute on the same server machine (e.g., registry server machine 132). According, to one embodiment, the above operations may be executed on a single server machine (e.g., registry server machine 132).

Figure 2A:
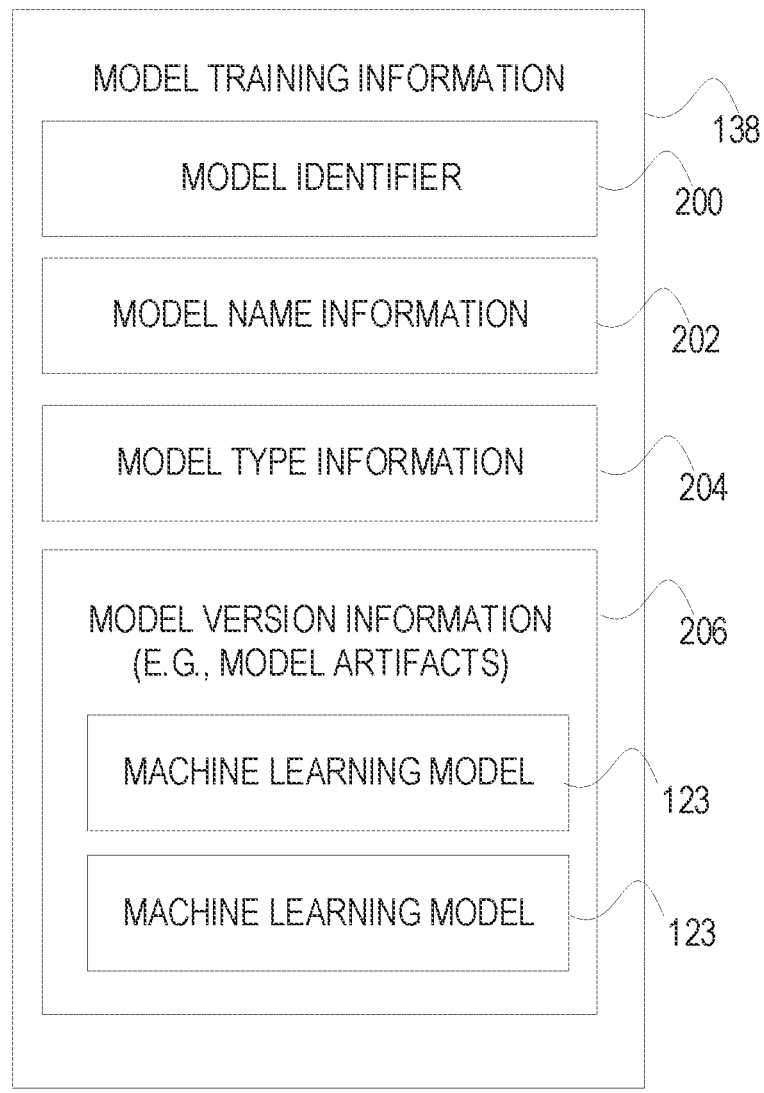
FIG. 2A is a block diagram illustrating model training information, according to an embodiment.

FIG. 2A is a block diagram illustrating model training information 138, according to an embodiment. The model training information 138 includes a model identifier 200, a model name information 202, a model type information 204, and model version information 206. The model identifier 200 uniquely identifies the model in the machine learning model registry system 118. The model name information 202 may include an alphanumeric string that is the name the model (e.g., "Home Price Prediction Model"). For example, the machine learning model registry 125 may receive the string "Linear Regression" from a user operating a client device 122. The model type information 204 may include an alphanumeric string that is the type of the model. The model version information 206 may include one or more elements of the machine learning model 123. Each element of the machine learning model 123 corresponds to a version of the machine learning model 123 identified by the model identifier 200 and trained with a specific set of training data (e.g., model artifact).

Figure 2B:
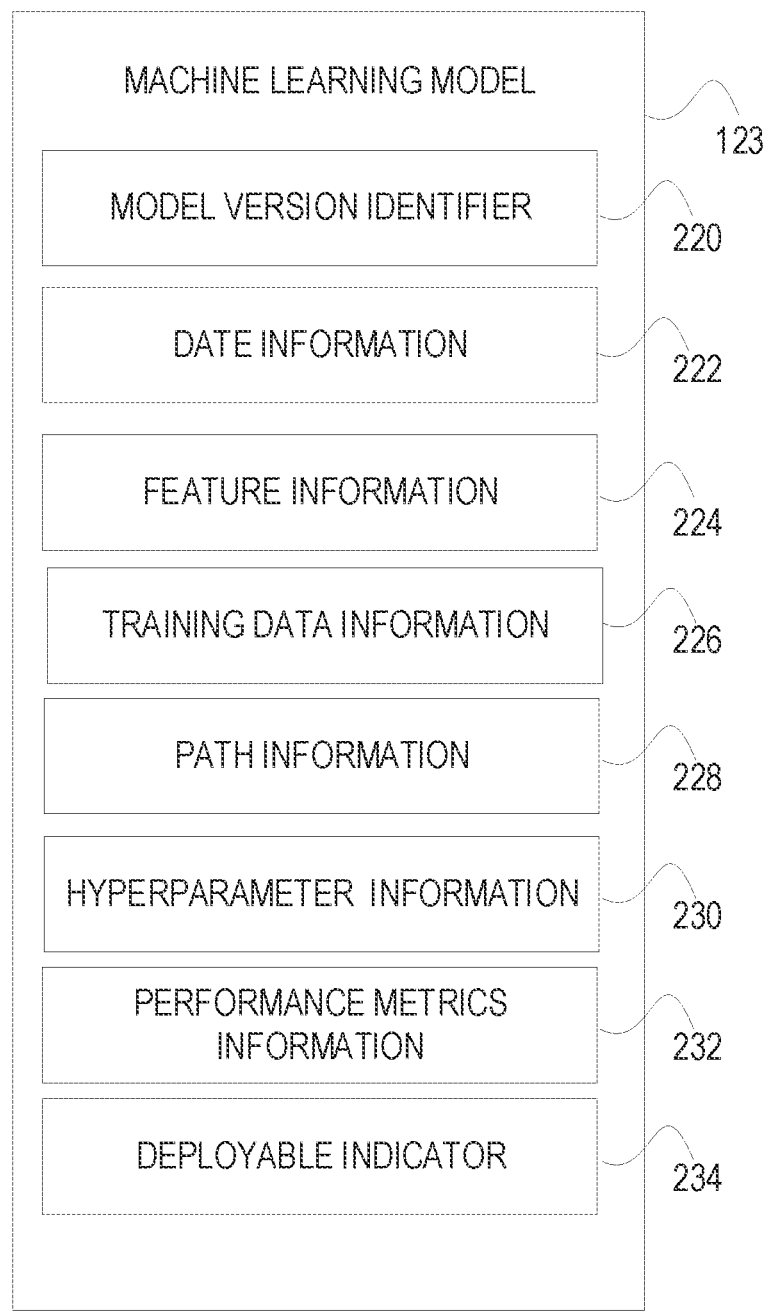
FIG. 2B is a block diagram illustrating a machine learning model, according to an embodiment.

FIG. 2B is a block diagram illustrating the machine learning model 123, according to an embodiment. The machine learning model 123 may include the model version identifier 220, date information 222, feature information 224, training data information 226, path information 228, hyperparameter information 230, performance metrics information 232, and a deployable indicator 234. The model version identifier 220 uniquely identifies a version of the machine learning model 123 in the machine learning model registry system 118. The date information 222 registers the date the version of the model was trained. The feature information 224 registers the number of features and the types of features utilized by the machine learning model 123. For example, the number of features may be an integer (e.g., 3) and the types of features may include square footage, number of bathrooms, and number of bedrooms. The training data information 226 includes the training data utilized to train the machine learning model 123 identified by the model version identifier 220 (e.g., "first version," "second version," and the like). The path information 228 stores a network path (e.g., universal resource locater) to the machine learning model 123 stored in the distributed server machine 130. The hyperparameter information 230 stores the parameters utilized for configuring the version of the machine learning model 123. The performance metrics information 232 registers one or more model evaluation metrics (e.g., mean squared error metric) utilized for measuring the performance of the version machine learning model 123. The deployable indicator 234 stores whether the version of the machine learning model 123 is deployable. For example, the deployable indicator 234 may be registered "TRUE" indicating the machine learning model 123 is deployable. Otherwise, deployable indicator 234 is registered "FALSE."

Figure 2C:
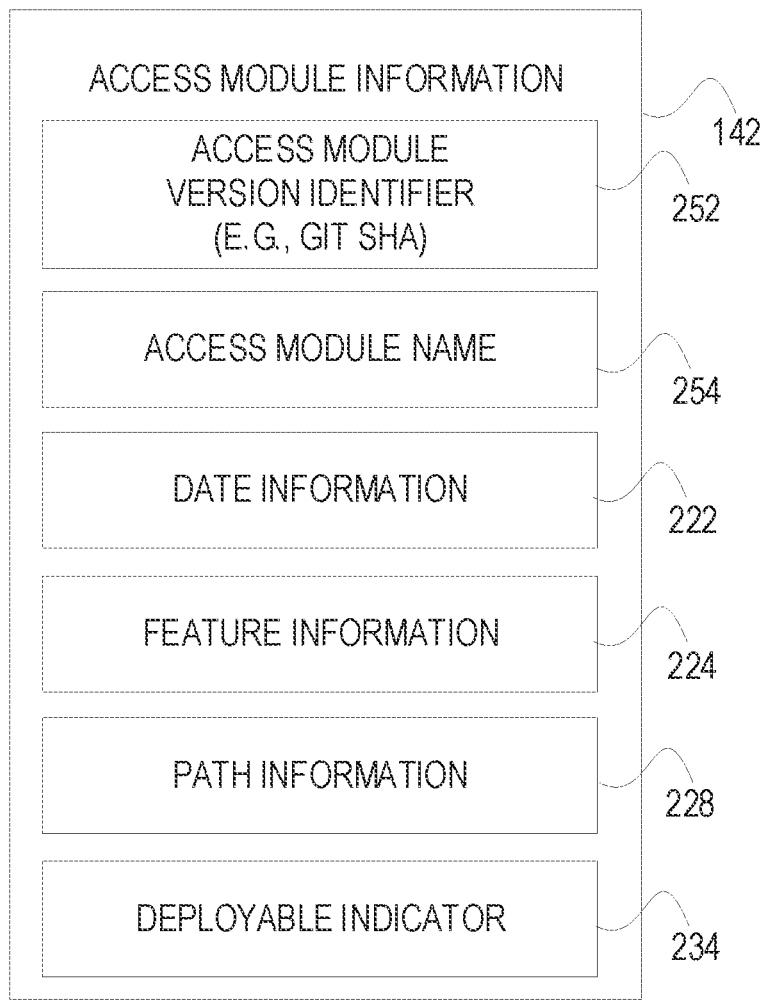
FIG. 2C is a block diagram illustrating access module information, according to an embodiment.

FIG. 2C is a block diagram illustrating access module information 142, according to an embodiment. The access module information 142 may include an access module version identifier 252 (e.g., Git sha), an access module name 254, date information 222, feature information 224, path information 228, and the deployable indicator. Each element of the access module information 142 corresponds to a version of the access module 121. The access module version identifier 252 (e.g., Git sha) uniquely identifies a version of the access module 121 in the machine learning model registry system 118. The date information 222 may store the date the version of the access module 121 was committed to the Git source control system. The feature information 224 may store the number of features and the types of features utilized by the version of the access module 121. For example, the number of features may be an integer (e.g., 3) and the types of features may include square footage, number of bathrooms, and number of bedrooms. The path information 228 stores a network path to the access module 121 stored on the distributed server machine 130. The deployable indicator 234 registers whether the version of the access module 121 is deployable. For example, the deployable indicator 234 may be registered "TRUE" indicating the machine learning model 123 is deployable. Otherwise, deployable indicator 234 is registered "FALSE."

Figure 2D:
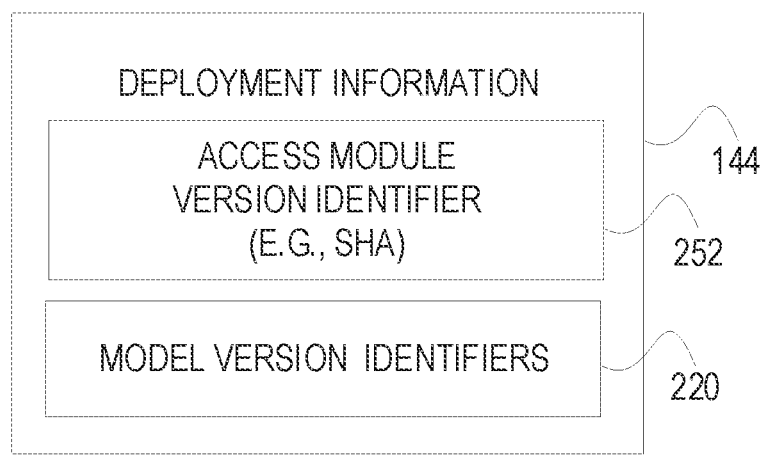
FIG. 2D is a block diagram illustrating deployment information, according to an embodiment.

FIG. 2D is a block diagram illustrating deployment information 144, according to an embodiment. The deployment information 144 includes an access module version identifier 252 and one or more model version identifiers 220, as previously described. Accordingly, each element of deployment information 144 associates the identified version of the access module 121 with one or more identified versions of the machine learning models 123. The deployment information 144 may be utilized to identify parings of a version of an access module 121 to one or more versions of machine learning models 123 that may be deployed to provide the predicting service on the API serving server machines 134.

Figure 3A:
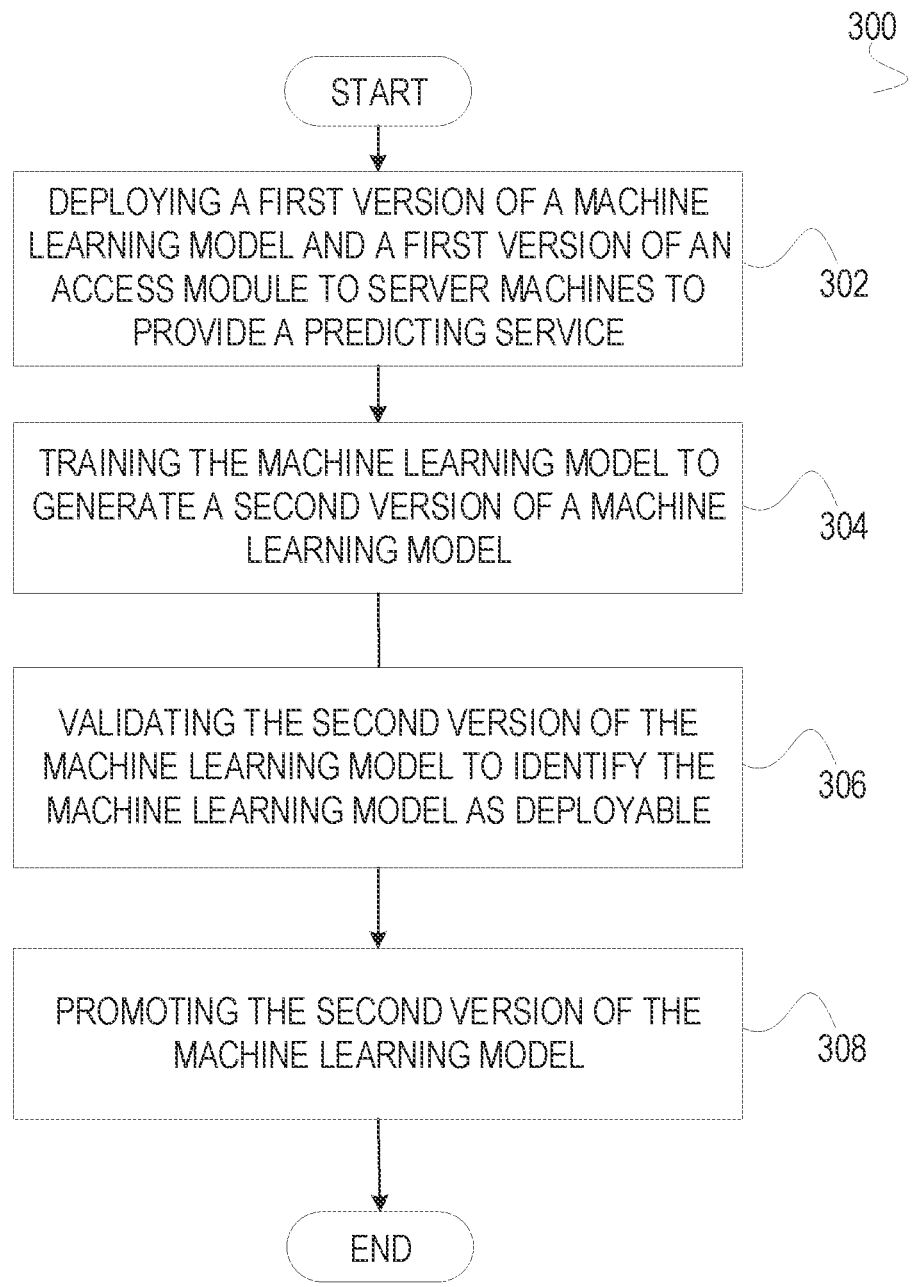
FIG. 3A is a block diagram illustrating a method, according to an embodiment, to deploy a version of the machine learning model.

FIG. 3A is a block diagram illustrating a method 300, according to an embodiment, to deploy a version of the machine learning model 123. The method 300 utilizes the machine learning model registry system 118 to deploy the version of a machine learning model 123, according to an embodiment. The method commences at operation 302, at the registry server machine 132, with the registry module 140 deploying a first version (e.g., "Version 01") of a machine learning model 123 and a first version of an access module 121 (e.g., "Version 01") to one or more API service server machines 134. For example, the registry server machine 132 may identify three API service server machines 134 in the machine learning model registry 125 as currently providing a "Home Valuation" (e.g., model name information 202) prediction service and communicate the "Version 01" of the appropriate machine learning model 123 and "Version 01" of the access module 121 (e.g., predictive service software) to each of the API service server machines 134. Responsive to receiving the predictive service software, each of the API service server machines 134 installs the predictive service software and provides the predicting service based on the predictive service software including the "Version 01" of the machine learning model 123 and the "Version 01" of the access module 121.

At operation 304, the training server machine 128 trains (e.g., retrains) the machine learning model 123 to generate a second version of the machine learning model 123. For example, the training server machine 128 may receive an updated version of the machine learning model 123, updated training data information 226, or updated hyperparameter information 230 and so forth. According to an embodiment, a cron job, executing at the training server machine 128, retrains the machine learning model 123 by utilizing the updated version of the machine learning model 123 and/or by utilizing the updated training data information 226 and/or by utilizing the updated hyperparameter information 230 to generate the second version (e.g., "Version 02") of the machine learning model 123.

At operation 306, the training server machine 128 validates the second version (e.g., "Version 02") of the machine learning model 123 to identify that the second version of the machine learning model 123 is deployable. For example, the "cron job" validates the machine learning model 123 by comparing the machine learning model 123 with a machine learning model 123 being utilized as a benchmark based on predetermined criteria, as previously described.

At operation 308, the registry server machine 128 promotes the second version of the machine learning model 123. For example, the registry server machine 128 promotes the second version of the machine learning model 123 responsive to receiving a "promote" command from a user via the user interface to promote the second version of the machine learning model 123. Responsive to receiving the "promote" command, the registry module 140, at the registry server machine 132, automatically identifies the first version of the access module 121 as being interoperable with the second version of the machine learning model 123 and automatically deploys the first version of the access module and the second version of the machine learning model to multiple API service server machines 134. These operations are further described in method 350 on FIG. 3B.

Figure 3B:
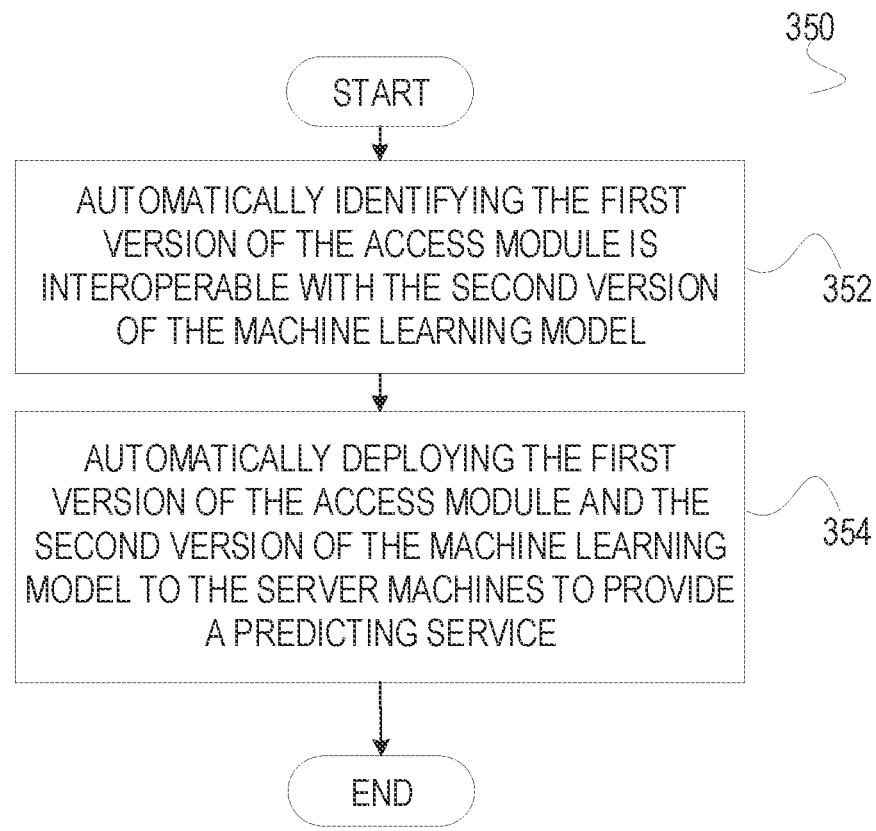
FIG. 3B is a block diagram illustrating a method, according to an embodiment, to promote a version of the machine learning model.

FIG. 3B is a block diagram illustrating a method 350, according to an embodiment, to promote a version of the machine learning model 123. The method 350 provides further description of operation 308 in the method 300, as illustrated in FIG. 3A. At operation 352, the registry module 140, at the registry server machine 132, receives input information including the model name information 202 (e.g., "Home Valuation" and the model version identifier 220 (e.g., "Version 2") via a user interface, from the user. For example, the user may have executed the "promote" command. Responsive to receiving the input information, the registry module 140 utilizes the input information to search the deployment information 144 in the machine learning model registry 125 to identify the access module 121. For example, the registry module 140 searches the deployment information 144 in the machine learning model registry 125 to match model version identifier 220 received from the user with the model version identifier 220 in an element of the deployment information 144. Responsive to identifying matching model version identifiers 220, the registry module 140 utilizes the associated access module version identifier 252 in the element of the deployment information 144 to identify the appropriate access module 121.

At operation 354, the registry module 140, at the registry server machine 132, responds to an execution of the "promote" command by automatically deploying the identified version of the access module 121 and the identified version of the machine learning model 123. For example, the registry server machine 132 may deploy the identified version of the access module 121 and the identified version of the machine learning model 123 to one or more API service server machines 134 identified as providing the prediction service.

Figure 4A:
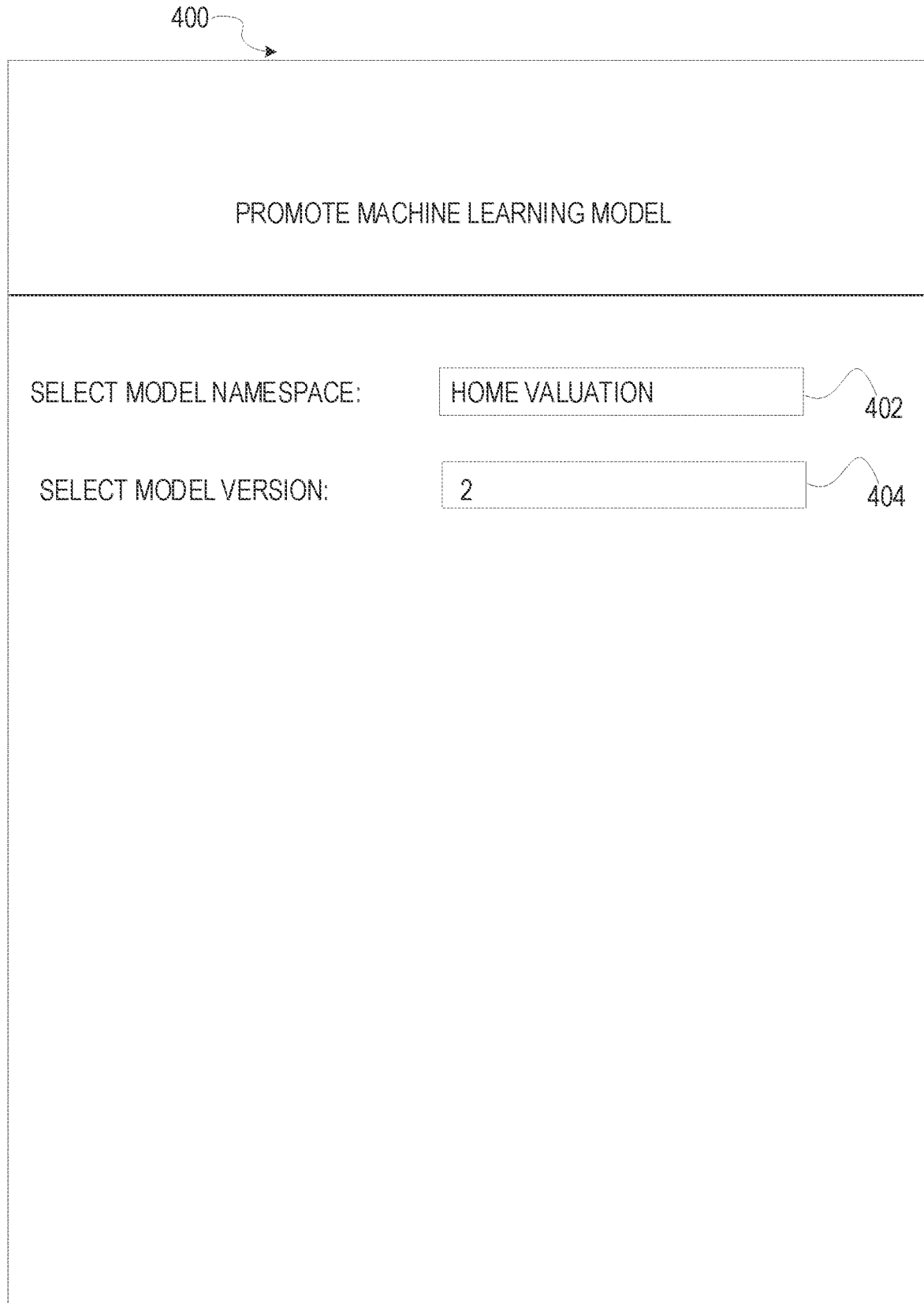
FIG. 4A is a diagram illustrating a user interface, according to an embodiment.

FIG. 4A is a diagram illustrating a user interface 400, according to an embodiment, to promote a machine learning model. The user interface 400 may be utilized by the "promote" command. The user interface 400 includes a first input box 402 to receive the name of the model (e.g., "Home Valuation") and a second input box 404 to receive the model version (e.g., "2"). For example, the input box 402 may be embodied as a pull down menu including model name information 202 from each of the model training information 138 stored in the machine learning model registry 125. Further for example, the input box 404 may be embodied as a pull down menu including model version identifiers 220 from each of the model training information 138 stored in the machine learning model registry 125 and associated with the selected model name information 202.

Figure 4B:
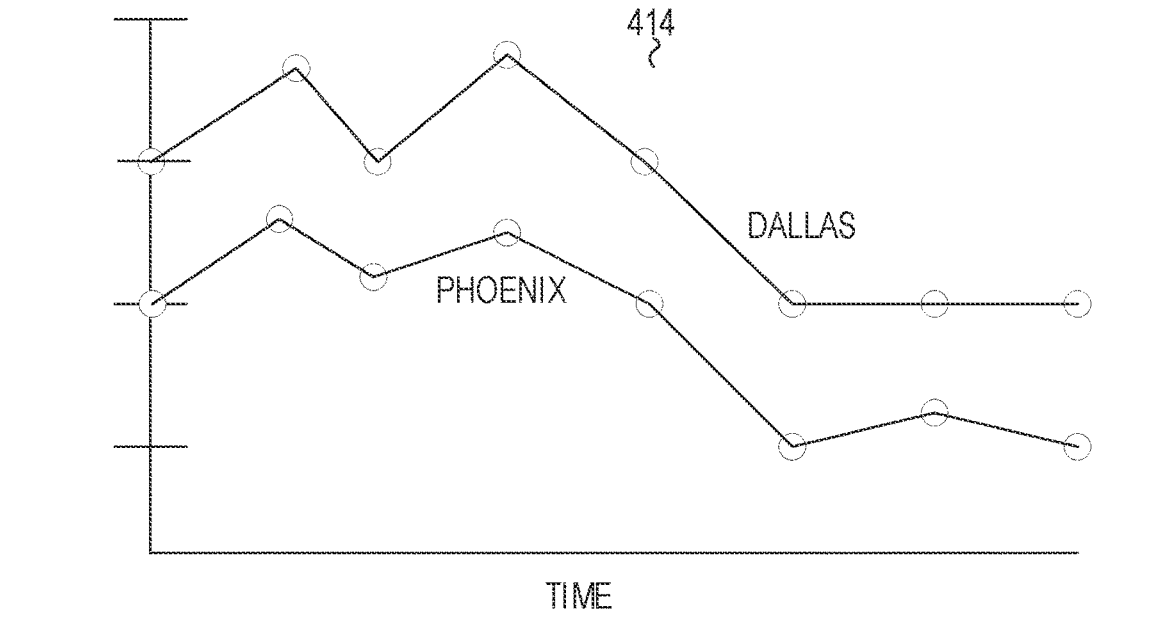
FIG. 4B is a diagram illustrating a user interface, according to an embodiment.

FIG. 4B is a diagram illustrating an example user interface 410, according to an embodiment, to search for model training information 138 and compare machine learning models 123. The user interface 410 includes multiple input boxes 412 for receiving input that is utilized to identify one or more elements of machine learning models 123 to generate a chart 414 enabling a comparison (e.g., mean squared errors) of two machine learning models 123 over time for two cities (e.g., Dallas and Phoenix). The input boxes 412 may be embodied as pull down menus that are utilized to select a model, select filters, and select a graph.

The input boxes for selecting a model may be utilized to identify a machine learning model 123 that has been trained (e.g., a machine learning model artifact). The input boxes to select the model include a namespace input box 416, a model type input box 418, and a model version input box 419. The namespace input box 416 may be utilized to select a model name from the model name information 202 in the machine learning model 123. The model type input box 418 may be utilized to select a model type from model type information 204 in the machine learning model 123. The model version input box 419 may be utilized to select a model version number from the model version identifier 220 in the machine learning model 123.

The input boxes for selecting filters may include a date range input box 420, an environmental input box 422, a name input box 424, a created by input box 426, and a logical comparison input box 428. The date range input box 420 may be utilized to select a date range to plot the predictions in the graph. The environmental input box 422 may be utilized to select a hyperparameter from the hyperparameter information 230 in the machine learning model 123 to plot the predictions in the graph. The name input box 424 may be utilized to select a name to label the graph. The created by input box 426 may be utilized to select a user-name to label the graph. The logical comparison input box 428 may be utilized to select elements (e.g., cities) for plotting the predictions in the graph. Other elements for logically comparing may include states, counties, countries, regions, and so forth.

The input boxes for selecting a graph may include a metrics input box 430 and a parameters input box 432. The metrics input box 430 may be utilized to select a metric from performance metrics information 232 in the machine learning model 123 for plotting the predictions in the graph. The parameters input box 432 may be utilized to select a hyperparameter from hyperparameter information 230 in the machine learning model 123 to plot the predictions in the graph.

Figure 4C:
FIG. 4C is a diagram illustrating a user interface, according to an embodiment.

FIG. 4C is a diagram illustrating a user interface 450, according to an embodiment, to identify reasons for a machine learning model 123 failing a validation. The user interface 450 includes candidate model information 452, date information 454, error information 456, and row information 458. The candidate model information 452 includes the name, type, and version of the machine learning model 123. For example, the name may be retrieved from the model name information 202 in the model training information 138; the type may be retrieved from the model type information 204 in the model training information 138; and the version may be retrieved from the model version identifier 220 in the machine learning model 123.

The date information 454 includes creation dates for the candidate model and the benchmark model. The candidate model may include the machine learning model 123 being validated. The benchmark model may include the machine learning model 123 being utilized for comparisons in the validation.

The error information 454 displays the type of error causing the validation to fail. For example, the error information displays a "COEFFICIENT SHIFT" indicating one of the coefficients of the machine learning model 123 candidate was not included in a predetermined range. The row information 458 may display additional information regarding the error. For example, the row information 458 displays dissimilar square footage coefficients (e.g., "SQ FT"). The machine learning model 123 candidate entitled "Home Valuation—Linear Regression—Version 25 Model" failed validation because the square footage coefficient (e.g., 100) for the machine learning model 123 candidate is identified as being dissimilar from a square footage coefficient (e.g., 80) for the benchmark machine learning model 123. According to an embodiment, a dissimilar square footage coefficient may be defined as a candidate square footage coefficient that is identified as not being included in a predetermined range of square footage coefficients defined by a lower limit=(benchmark square footage coefficient−X) (e.g., 70=80−10) and an upper limit=benchmark square footage coefficient+X (e.g., 90=80+10).

Machine and Software Architecture

The modules, methods, engines, applications, and so forth described in conjunction with FIGS. 1C-3B are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 5:
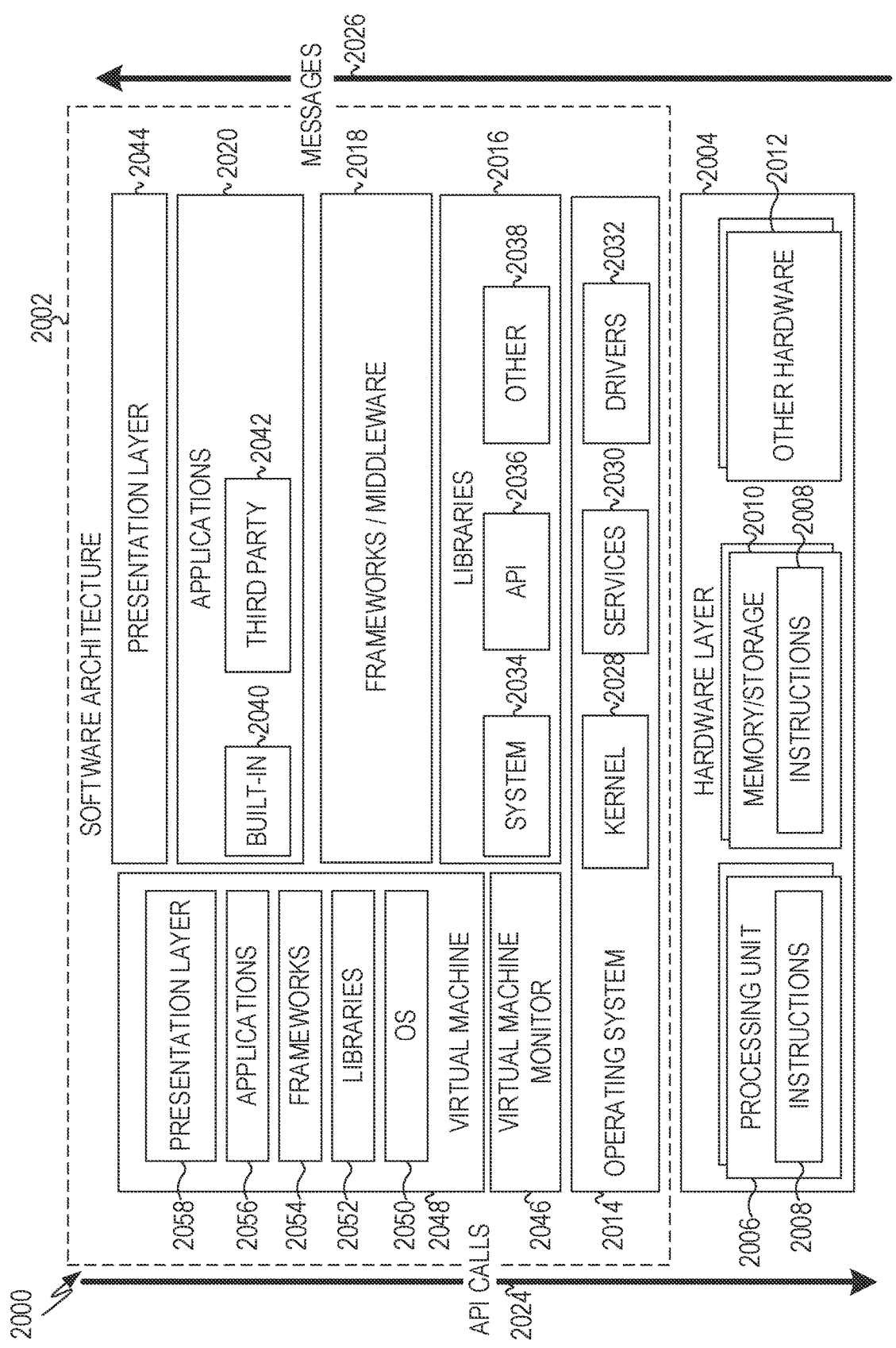
FIG. 5 is a block diagram illustrating a representative software architecture.

FIG. 5 is a block diagram 2000 illustrating a representative software architecture 2002, which may be used in conjunction with various hardware architectures herein described. FIG. 5 is merely a non-limiting example of a software architecture 2002, and it will be appreciated that many other architectures may be implemented to facilitate the functionality described herein. The software architecture 2002 may be executing on hardware such as a machine 2100 of FIG. 6 that includes, among other things, processors 2110, memory/storage 2130, and input/output (I/O) components 2150. Returning to FIG. 5, a representative hardware layer 2004 is illustrated and can represent, for example, the machine 2100 of FIG. 6. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1C-3B. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 5, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), augmentative and alternative communication (AAMC), adaptive multi-rate audio codec (AMR), joint photography experts group (JPG), or portable network graphics (PNG)), graphics libraries (e.g., an Open Graphics Library (OpenGL) framework that may be used to render two dimensional (2D) and three dimensional (3D) graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphical user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built-in applications as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 5, this is illustrated by a virtual machine 2048. The virtual machine 2048 creates a software environment where applications/modules can execute as if they were executing on a hardware machine (such as the machine 2100 of FIG. 6, for example). The virtual machine 2048 is hosted by a host operating system (e.g., operating system 2014 in FIG. 5) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Readable Medium

Figure 6:
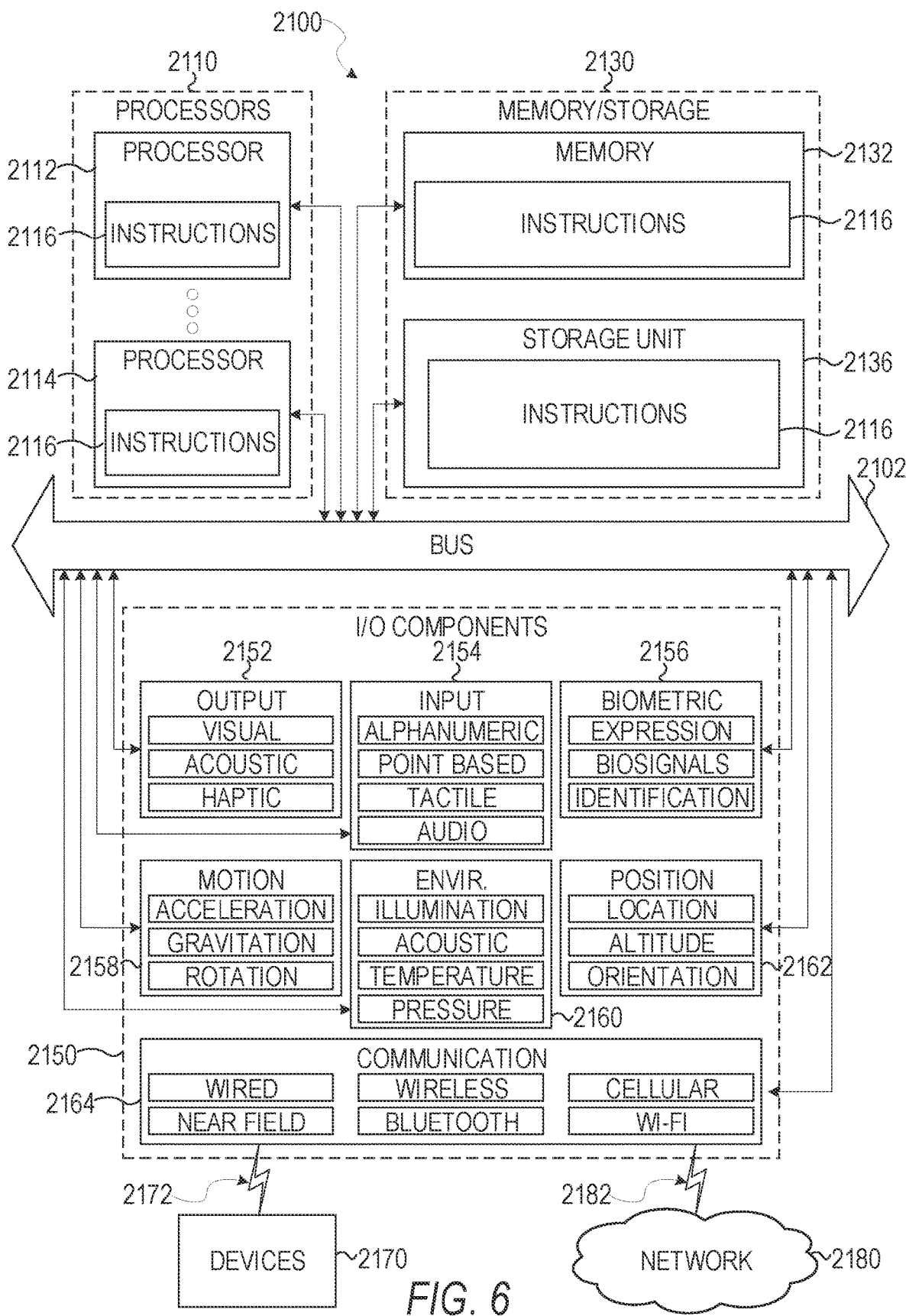
FIG. 6 is a block diagram illustrating components of a machine, according to some example embodiments.

FIG. 6 is a block diagram illustrating components of a machine 2100, according to an embodiment, able to read instructions from a machine-readable medium (e.g., a machine-readable storage medium) and perform any one or more of the methodologies discussed herein. Specifically, FIG. 6 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may include a set of instructions that cause the machine 2100 to execute the flow diagrams of FIGS. 3A-3B. Additionally, or alternatively, the instructions 2116 may implement the modules of FIGS. 1C-3B. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 6 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 6. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via IP geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)) Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the at least one processor to perform operations comprising:
   automatically deploying a first version of an access module and a first version of a machine learning model to a plurality of machines to provide a prediction service;
   generating a second version of the access module;
   automatically identifying the second version of the access module as being interoperable with the first version of the machine learning model; and
   automatically deploying the second version of the access module and the first version of the machine learning model to the plurality of machines to provide the prediction service.

2. The system of claim 1, wherein the operations further comprise:
   retraining the first version of the machine learning model to generate a second version of the machine learning model, wherein the second version of the machine learning model is a linear regression model.

3. The system of claim 2, wherein the operations further comprise:
   validating the second version of the machine learning model to identify the second version of the machine learning model as being deployable, wherein the validating the second version of the machine learning model is based on predetermined criteria.

4. The system of claim 3, wherein the predetermined criteria includes a model evaluation metric.

5. The system of claim 4, wherein the model evaluation metric includes a mean squared error metric.

6. The system of claim 3, wherein the validating the second version of the machine learning model includes identifying that the second version of the access module and the second version of the machine learning model utilize common features, wherein the common features includes a number of features, wherein the access module includes a version identifier, a module name, and a deployable indicator, and wherein the deployable indicator indicates whether the version of the access module being identified by the version identifier is deployable.

7. The system of claim 6, wherein the validating the second version of the machine learning model includes identifying the second version of the access module is interoperable with the second version of the machine learning model.

8. The system of claim 2, wherein the operations further comprise:
   presenting a user interface including a comparison of the first version of the machine learning model with the second version of the machine learning model, wherein the comparison is based on a model evaluation metric.

9. The system of claim 8, wherein the operations further comprise:
   receiving an identifier for identifying the second version of the machine learning model.

10. A method comprising:
    automatically deploying a first version of an access module and a first version of a machine learning model to a plurality of machines to provide a prediction service;
    generating a second version of the access module by utilizing at least one processor;
    automatically identifying the second version of the access module as being interoperable with the first version of the machine learning model by utilizing at least one processor; and
    automatically deploying the second version of the access module and the first version of the machine learning model to the plurality of machines to provide the prediction service.

11. The method of claim 10, further comprising:
    retraining the first version of the machine learning model to generate a second version of the machine learning model, wherein the second version of the machine learning model is a linear regression model.

12. The method of claim 11, further comprising:
    validating the second version of the machine learning model to identify the second version of the machine learning model as being deployable, wherein the validating the second version of the machine learning model is based on predetermined criteria.

13. The method of claim 12, wherein the predetermined criteria includes a model evaluation metric.

14. The method of claim 13, wherein the model evaluation metric includes a mean squared error metric.

15. The method of claim 12, wherein the validating the second version of the machine learning model includes identifying the second version of the access module and the second version of the machine learning model as utilizing common features, wherein the common features includes a number of features, wherein the access module includes a version identifier, a module name, and a deployable indicator, and wherein the deployable indicator indicates whether the version of the access module being identified by the version identifier is deployable.

16. The method of claim 15, wherein the validating the second version of the machine learning model includes identifying that the second version of the access module interoperates with the second version of the machine learning model.

17. The method of claim 11, further comprising presenting a user interface including a comparison of the first version of the machine learning model with the second version of the machine learning model, wherein the comparison is based on a model evaluation metric.

18. The method of claim 17, further comprising:
receiving an identifier for identifying the second version of the machine learning model.

19. A non-transitory machine-readable medium and storing a set of instructions that, when executed by a processor, causes a machine to perform operations comprising:

automatically deploying a first version of an access module and a first version of a machine learning model to a plurality of machines to provide a prediction service;

generating a second version of the access module by utilizing at least one processor;

automatically identifying the second version of the access module as being interoperable with the first version of the machine learning model by utilizing at least one processor; and automatically deploying the second version of the access module and the first version of the machine learning model to the plurality of machines to provide the prediction service.

20. The non-transitory machine-readable medium of claim 19, wherein the operations further comprise training the first version of the machine learning model to generate a second version of the machine learning model, wherein the second version of the machine learning model is a linear regression model.

* * * * *